US009833962B2

(12) United States Patent
Charles

(10) Patent No.: US 9,833,962 B2
(45) Date of Patent: Dec. 5, 2017

(54) SYSTEMS AND METHODS FOR CONTROLLING MANUFACTURING PROCESSES

(71) Applicant: Toyota Motor Engineering & Manufacturing North America, Inc., Erlanger, KY (US)

(72) Inventor: Thoney R. Charles, Georgetown, KY (US)

(73) Assignee: Toyota Motor Engineering & Manufacturing Norh America, Inc., Erlanger, KY (US)

( * ) Notice: Subject to any disclaimer, the term of this patent is extended or adjusted under 35 U.S.C. 154(b) by 770 days.

(21) Appl. No.: 14/190,711

(22) Filed: Feb. 26, 2014

(65) Prior Publication Data

US 2015/0239194 A1 Aug. 27, 2015

(51) Int. Cl.
*G06F 19/00* (2011.01)
*B21B 39/20* (2006.01)
(Continued)

(52) U.S. Cl.
CPC ............ *B30B 15/148* (2013.01); *B30B 15/30* (2013.01)

(58) Field of Classification Search
CPC ..... B30B 15/148; B30B 15/30; B30B 15/308; B21K 31/00
(Continued)

(56) References Cited

U.S. PATENT DOCUMENTS 4,596,971 A * 6/1986 Hirabayashi ......... H01H 36/008 335/205
4,793,466 A * 12/1988 Petitcollin .............. B65G 43/08 198/502.3

(Continued)

FOREIGN PATENT DOCUMENTS

| | | | |
|---|---|---|---|
| EP | 1475748 | A2 | 11/2004 |
| WO | 9916010 | A1 | 4/1999 |
| WO | 2011005110 | A1 | 1/2011 |

OTHER PUBLICATIONS

Microscan Systems, Inc., http://www.unicroscan.com/en-usiproducts/machine-vision-systems.aspx, "Machine Vision Systems, Software and Hardware", 2013.

(Continued)

*Primary Examiner* — James D Rutten
(74) *Attorney, Agent, or Firm* — Dinsmore & Shohl LLP

(57) ABSTRACT

In one embodiment, a method for controlling a manufacturing process can include obstructing a part receiving path of a press station with a part detection fixture. The part detection fixture can include a moveable contact member and a target body that moves in response to motion of the moveable contact member. The moveable contact member of the part detection fixture can obstruct the part receiving path such that the target body of the part detection fixture is positioned in a dissenting state. The target body of the part detection fixture can be positioned in an assenting state coincident with contact between the moveable contact member of the part detection fixture and the workpiece. Image data of the target body of the part detection fixture can be detected with a vision system. The press station can be actuated when the image data is indicative of the assenting state.

20 Claims, 6 Drawing Sheets

(51) Int. Cl.
*A01F 25/14* (2006.01)
*B30B 15/14* (2006.01)
*B30B 15/30* (2006.01)

(58) Field of Classification Search
USPC ........ 700/114, 112, 228; 198/502.3; 356/614
See application file for complete search history.

(56) References Cited

U.S. PATENT DOCUMENTS

| | | | | | |
|---|---|---|---|---|---|
| 4,887,446 | A * | 12/1989 | Maher | B21D 43/055 198/621.2 |
| 5,692,593 | A * | 12/1997 | Ueno | B65G 47/647 198/369.2 |
| 5,810,154 | A * | 9/1998 | Brouwer | B65G 47/261 198/502.3 |
| 5,838,357 | A * | 11/1998 | Maslanka | B41J 2/32 347/15 |
| 5,880,961 | A * | 3/1999 | Crump | G06T 17/10 700/112 |
| 5,906,262 | A * | 5/1999 | Miki | B65G 54/02 198/341.02 |
| 5,960,125 | A | 9/1999 | Michael et al. | |
| 5,987,958 | A * | 11/1999 | Moore, Jr. | B21D 5/002 700/114 |
| 6,137,893 | A | 10/2000 | Michael et al. | |
| 6,167,150 | A | 12/2000 | Michael et al. | |
| 6,563,324 | B1 | 5/2003 | Nichani | |
| 6,771,819 | B2 | 8/2004 | DeYong et al. | |
| 7,620,209 | B2 | 11/2009 | Stevick et al. | |
| 7,710,558 | B2 | 5/2010 | Wornson et al. | |
| 8,111,904 | B2 | 2/2012 | Wallack et al. | |
| 8,534,113 | B2 | 9/2013 | Bryll et al. | |
| 8,706,264 | B1 * | 4/2014 | Peterson | G05B 19/4183 356/614 |
| 2013/0120557 | A1 | 5/2013 | King et al. | |

OTHER PUBLICATIONS

Mitutoyo American Home, http://www.mitutoyo.com/videos/product-demos, "Category Archives: Product Emos Automated Measurement Cell", Oct. 29, 2013.

* cited by examiner

SYSTEMS AND METHODS FOR CONTROLLING MANUFACTURING PROCESSES

TECHNICAL FIELD

The present specification generally relates to systems and methods for controlling manufacturing processes and, more specifically, to systems and methods for controlling manufacturing processes with vision systems.

BACKGROUND

Transfer press assemblies are often used in various manufacturing industries, such as automotive and appliance industries, due to the relatively large volume of parts that can be produced in a progressive, automated fashion. Multiple die stations are often provided, where a blank is delivered to each of the dies stations in successive fashion for a forming operation. The part is often delivered to each of the die stations using a transfer feeder assembly. Transfer feeder bars of the transfer feeder assembly move along an axis for moving the parts from one die station to the next. Automation of the transfer press assembly can utilize various sensors and processors to synchronize the operation of the die stations and the transfer feeder assembly. The performance of the transfer press assembly can be impacted by the control systems and methods utilized for automation.

Accordingly, a need exists for alternative systems and methods for controlling manufacturing processes with vision systems.

SUMMARY

In one embodiment, a method for controlling a manufacturing process can include obstructing a part receiving path of a press station with a part detection fixture. The part detection fixture can be attached to the press station. The part detection fixture can include a moveable contact member and a target body that moves in response to motion of the moveable contact member. The moveable contact member of the part detection fixture can obstruct the part receiving path such that the target body of the part detection fixture is positioned in a dissenting state. The workpiece can be received along the part receiving path of the press station. The moveable contact member of the part detection fixture can contact the workpiece. The target body of the part detection fixture can be positioned in an assenting state coincident with contact between the moveable contact member of the part detection fixture and the workpiece. Image data of the target body of the part detection fixture can be detected with a vision system. The target body of the part detection fixture can be positioned in the assenting state, and the image data of the target body can be indicative of the assenting state. The press station can be actuated when the image data of the target body is indicative of the assenting state.

In another embodiment, a method for controlling a manufacturing process can include obstructing a part receiving path of a press station with a part detection fixture. The part detection fixture can be attached to the press station and can include a moveable contact member and a target body that moves in response to motion of the moveable contact member. The moveable contact member of the part detection fixture can obstruct the part receiving path such that the target body of the part detection fixture is positioned in a dissenting state. Image data of the target body of the part detection fixture can be detected with a vision system, while the target body of the part detection fixture is positioned in the dissenting state. The image data of the target body can be indicative of the dissenting state. A workpiece can be received along the part receiving path of the press station when the image data of the target body is indicative of the dissenting state.

In yet another embodiment, a system for controlling a manufacturing process can include a press station, a complimentary die assembly, a feed assembly, an actuation system, a part detection fixture, a vision system and a control system. The press station can include a ram member and a bolster member. The ram member can be operable to move relative to the bolster member. The complimentary die assembly can include a ram die attached to the ram member and a bolster die attached to the bolster member. The feed assembly can be operable to move a workpiece with respect to the press station. The actuation system can be operably coupled to the feed assembly and the press station. The part detection fixture can be attached to the bolster member of the press station. The part detection fixture can include a moveable contact member and a target body that moves in response to motion of the moveable contact member. The moveable contact member of the part detection fixture can obstruct a part receiving path of the press station. The vision system can have a field of view. The target body of the part detection fixture can be located within the field of view of the vision system. The control system can be communicatively coupled to the actuation system and the vision system. The control system can execute functions to automatically open the press station wherein the ram die and the bolster die are separated by a relatively large offset. The control system can execute functions to automatically receive image data of the target body of the part detection fixture from the vision system. The control system can execute functions to automatically urge the workpiece along the part receiving path of the press station, after the image data of the target body is indicative of the target body of the part detection fixture located in a dissenting state. The workpiece can contact the moveable contact member of the of the part detection fixture, while being urged along the part receiving path of the press station. The contact between the moveable contact member of the part detection fixture and the workpiece can cause the target body of the part detection fixture to move to an assenting state. The control system can execute functions to automatically close the press station wherein the ram die and the bolster die are separated by a relatively small offset, when the image data of the target body is indicative of the target body of the part detection fixture located in the assenting state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
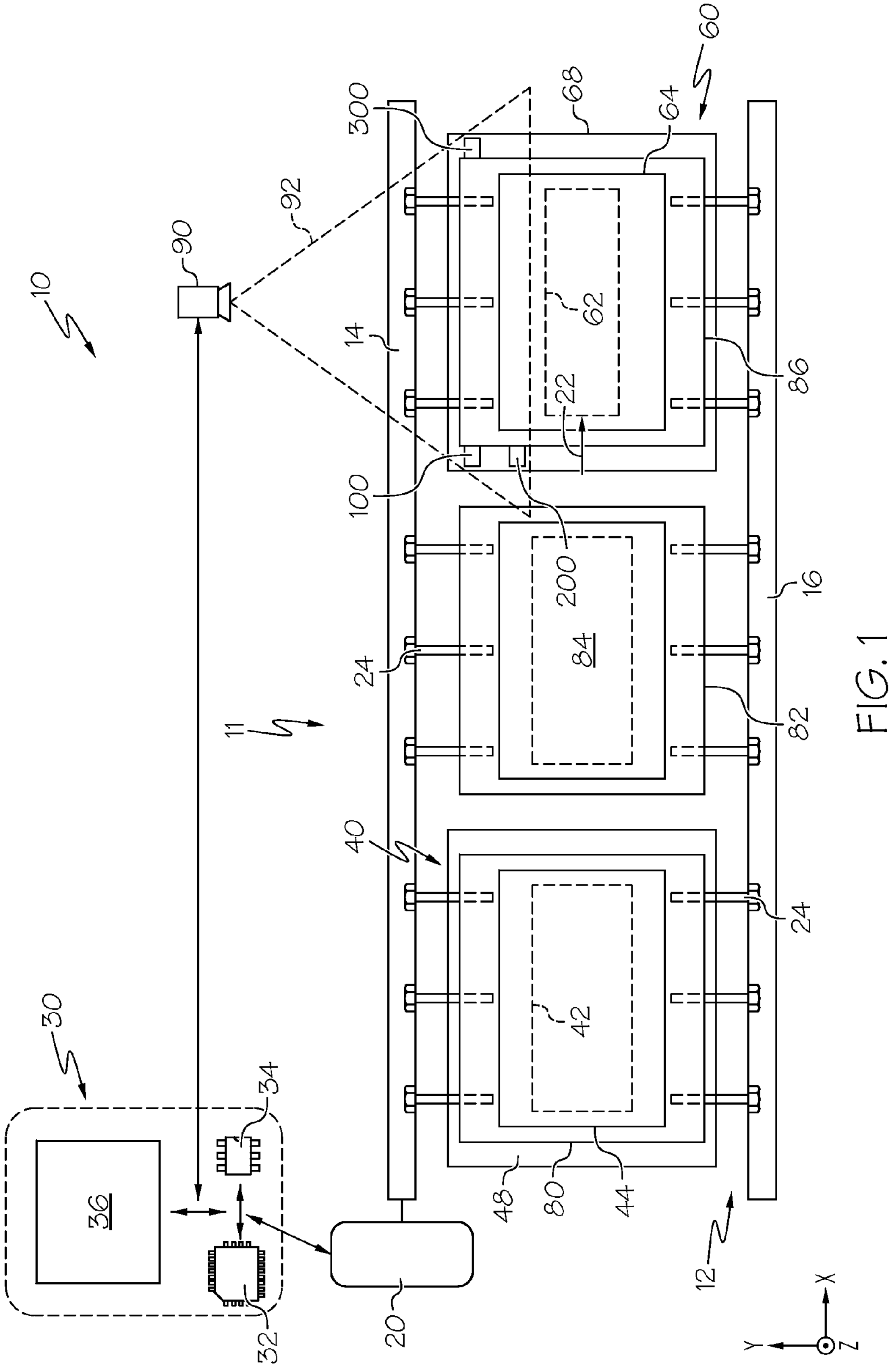
FIG. 1 schematically depicts a system for controlling manufacturing processes according to one or more embodiments shown and described herein.

FIG. 1 generally depicts one embodiment of a system for controlling manufacturing processes. The system generally comprises a press assembly, a vision system, and one or more part detection fixtures. The vision system can be operable to detect the one or more part detection fixtures. Various embodiments of the system for controlling manufacturing processes and the operation of the system for controlling manufacturing processes will be described in more detail herein.

Referring to FIG. 1, a system 10 for controlling manufacturing processes is schematically depicted. The system 10 can comprise a press assembly 11 for forming a workpiece 80 by exerting pressure upon the workpiece 80. In some embodiments, the press assembly 11 can be configured as a transfer press. Accordingly, the press assembly 11 can comprise a feed assembly 12 for automatically moving the workpiece 80 along a feed direction 22, which is depicted in FIG. 1 as being in substantial alignment with the x-axis, from a first press station 40 to a second press station 60. Thus, the press assembly 11 can be configured perform to forming processes in a progressive manner.

The feed assembly 12 can comprise a feed bar 14 and a feed bar 16 offset from one another and substantially aligned along the feed direction 22. In some embodiments, the feed bar 14 and the feed bar 16 can be substantially parallel to one another to define the feed direction 22 through the press assembly 11. Each feed bar 14 and feed bar 16 can comprise a plurality of fingers 24 for manipulating the workpiece 80. The fingers 24 of the feed bar 14 and the fingers 24 of the feed bar 16 can extend toward each other to span at least a portion of a distance between the feed bar 14 and the feed bar 16. Accordingly, the fingers 24 of the can be spaced closer to one another along the y-axis than the feed bar 14 and the feed bar 16. As is described in greater detail herein, the fingers 24 of the feed bar 14 and the feed bar 16 can cooperate to manipulate the workpiece 80 during forming processes.

The system 10 can comprise an actuation system 20 for providing motive force for components of the press assembly 11. Specifically, the actuation system 20 can comprise one or more servomechanism for providing a controlled amount of force to the press assembly 11 for moving the workpiece 80, forming the workpiece 80, or both. Accordingly, the actuation system 20 can comprise a mechanical actuator, a hydraulic actuator, a pneumatic actuator, an electrical actuator, or combinations thereof.

Referring still to FIG. 1, the system 10 can further comprise a control system 30 that comprises one or more processors 32 for automatically performing functions of the press assembly 11. For the purpose of defining and describing the present disclosure, it is noted that the term "processor" generally means a device that executes functions according to machine readable instructions such as, for example, an integrated circuit, a microchip, a computer, Programmable Logic Controller (PLC) or the like. It is furthermore noted that the functions described herein may comprise machine readable instructions having logic or algorithms written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either an FPGA configuration or an ASIC, or their equivalents.

The control system 30 can further comprise memory 34 communicatively coupled to the one or more processors 32, which is generally depicted in the FIGS. as arrows. The memory 34 can comprise non-transitory memory such as, for example, Random-Access memory (RAM) including, but not limited to, Dynamic Random-Access memory (DRAM) and Static Random-Access memory (SRAM); Read-only memory (ROM) including, but not limited to, Electrically Erasable Programmable Read-only memory (EEPROM), Erasable Programmable Read-only memory (EPROM); flash memory; Mechanical memory including, but not limited to, magnetic drive and hard drives; or any device capable of storing machine readable instructions. As used herein, the phrase "communicatively coupled" can mean that components are capable of exchanging data signals with one another such as, for example, electrical signals via conductive medium, electromagnetic signals via air, optical signals via optical waveguides, or the like.

In some embodiments, the control system 30 can comprise one or more input/output device 36 communicatively coupled to the one or more processors 32, memory 34, or both. The input/output device 36 can comprise an input device that receives tactile or audio input and transforms the input into a data signal such as, for example, a switch, a button, a microphone or the like. Alternatively or additionally, the input/output device 36 can comprise an output device for transforming signals from the one or more processors 32 into human interpretable form such as, for example, a display, a printer, a speaker, or the like.

As is noted above, the press assembly 11 can comprise the first press station 40 and the second press station 60. Each of the first press station 40 and the second press station 60 can be configured for performing forming operations such as, for example, drawing, trimming, bending, piercing, stamping, or the like. In some embodiments, the first press station 40 can comprise a complimentary die assembly 42 that is configured to form the workpiece 80 into a desired shape. Specifically, the first press station 40 can comprise a ram member 44 and a bolster member 48 that are configured for relative motion along a pressing direction, which is depicted in FIG. 1 as being substantially aligned with the z-axis. Accordingly, the complimentary die assembly 42 can be configured to receive the workpiece 80 when the ram member 44 and the bolster member 48 have a relatively large offset in the press direction and to strike the workpiece 80 when the ram member 44 and the bolster member 48 have a relatively small offset in the press direction. Thus, the first press station 40 can be configured to form the workpiece 80 into the workpiece 82. The workpiece 82 can comprise a shaped region 84 corresponding to the desired shape of the complimentary die assembly 42.

Figure 3A:
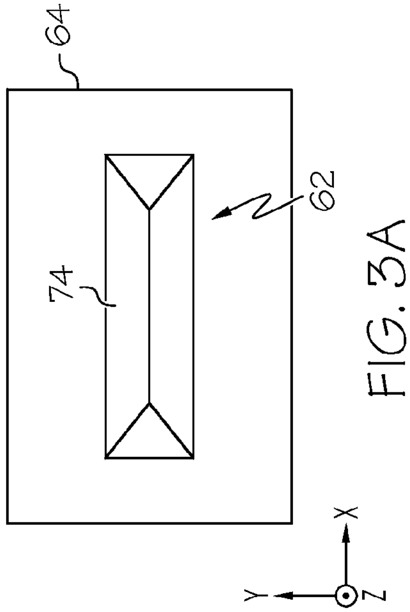
FIGS. 2, 3A and 3B schematically depict components of a complimentary die assembly according to one or more embodiments shown and described herein.
Figure 2:
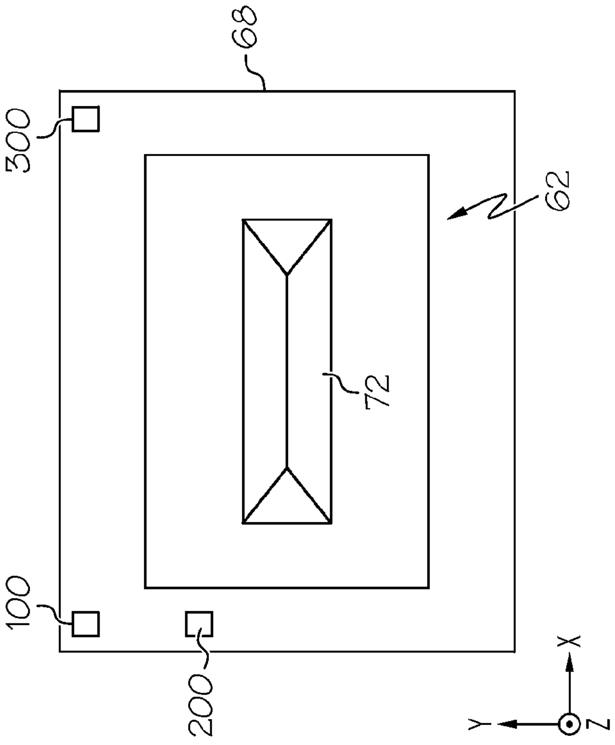

Referring collectively to FIGS. 1, 2, and 3A, the second press station 60 can comprise a complimentary die assembly 62 that is configured to form the workpiece 86 into a desired shape. Like the first press station 40, the second press station 60 can comprise a ram member 64 and a bolster member 68 that are configured for relative motion along the pressing direction, i.e., substantially along the z-axis. In some embodiments, the bolster member 68 can be substantially fixed and the ram member 64 can actuated along the part forming direction during the part forming processes. Accordingly, the bolster member 68 can be configured to be substantially rigid along the part forming direction.

The complimentary die assembly 62 can be configured to receive the workpiece 86 when the ram member 64 and the bolster member 68 have a relatively large offset in the press direction and to strike the workpiece 86 when the upper member 64 and the bolster member 68 have a relatively small offset in the press direction. In some embodiments, the complimentary die assembly 62 can comprise a bolster die 72 configured for attaching with the bolster member 68 and a ram die 74 configured for attaching with the ram member 64. The bolster die 72 and the ram die 74 can be shaped in a complimentary manner such that, when the workpiece 86 is disposed between the bolster die 72 and the ram die 74, the bolster die 72 and the ram die 74 cooperate to form the workpiece 86 into a predetermined shape. It is noted that the term "attach," as used herein, can mean affixing securely one object to another object such as, for example, via a fastener, via welding, by making integral, or the like.

Figure 3B:
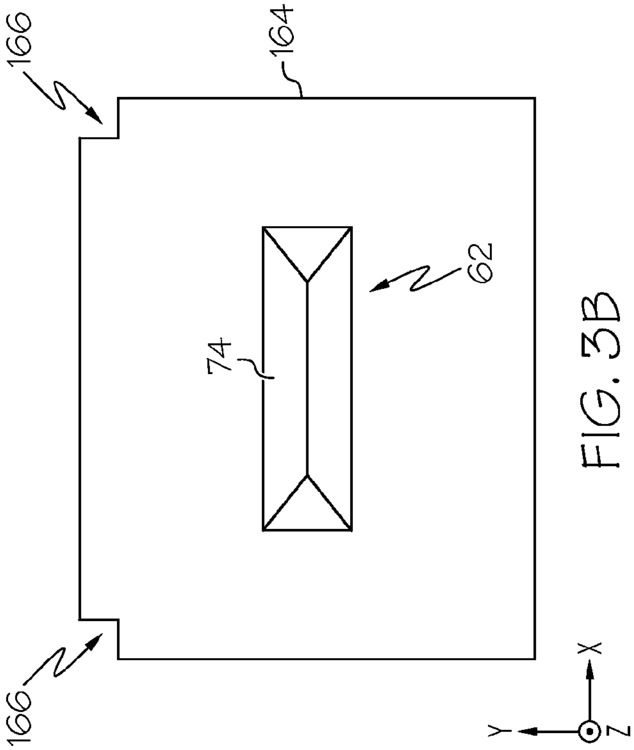

Referring collectively to FIGS. 3A and 3B, the ram member 64 can be shaped to avoid contact with the part detection fixture 100, when the complimentary die assembly 62 has a relatively small offset. Accordingly, the ram member 64 can be formed such that it occupies a small enough area to avoid the part detection fixture 100. Alternatively or additionally, the ram member 164 can be formed with one or more cutouts 166 that are sized to receive the part detection fixture 100 without making contact.

Referring again to FIG. 1, the system 10 can comprise a vision system 90 for capturing image data of a part detection fixture 100. The vision system 90 can comprise one or more sensors or cameras for capturing image data within a field of view 92. The image data can be captured in two dimensions or three dimensions in visible or infrared light. Accordingly, in some embodiments, the vision system 90 can comprise an infrared light source for illuminating the field of view 92 of the vision system 90. The vision system 90 can comprise one or more integral processor for performing image processing functions (e.g., a smart camera). Alternatively or additionally, the vision system 90 can be communicatively coupled to the one or more processors 32 such that the control system 30 performs image processing functions, interprets output from the vision system or both. Suitable vision systems include one or more of the machine vision systems available from Keyence Corporation of Itasca, Ill., USA or the vision sensors available from Banner Engineering Corp. of Minneapolis, Minn., USA.

Referring collectively to FIGS. 1, 2, 4A and 4B, the system 10 can comprise a part detection fixture 100 for detecting the presence of the workpiece 86 within the second press station 60. The part detection fixture 100 can comprise a moveable contact member 102 configured for movement in response to contact with the workpiece 86 and a target body 104 configured for movement in response to movement of the moveable contact member 102. The movement of the moveable contact member 102 and the target body 104 can comprise translation, rotation, or combinations thereof. In some embodiments, the moveable contact member 102 and the target body 104 can be integral. For example, the moveable contact member 102 can be located at a first end 116 of an arcuate body 114 and the target body 104 can be located at a second end 118 of the arcuate body 114. The arcuate body 114 can form a curved span between the moveable contact member 102 and the target body 104. Accordingly, the target body 104 can be offset vertically (z-direction), horizontally (x-direction or y-direction), or both from the moveable contact member 102.

Figure 4B:
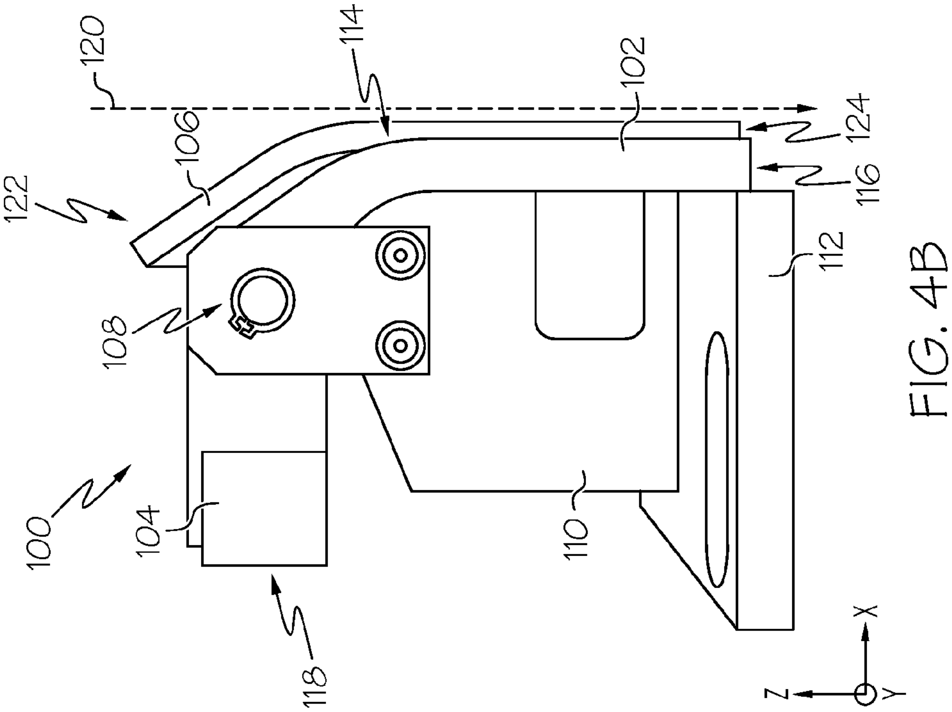
FIGS. 4A and 4B schematically depict a part detection fixture according to one or more embodiments shown and described herein.

The part detection fixture 100 can comprise a vertical member 110 for facilitating movement of the moveable contact member 102 and a mounting member 112 configured for attaching with the second press station 60. In some embodiments, the vertical member can extend substantially vertically, i.e., substantially along the z-axis, away from the mounting member 112. The moveable contact member 102 and the target body 104 can be configured to rotate with respect to the vertical member 110 of the part detection fixture 100. In some embodiments, the arcuate body 114 can be rotatably engaged with the vertical member 110 at an axis of rotation 108. The rotatable engagement can be formed by any device suitable to facilitate rotation such as, for example, an axle, a pin, a bearing, or the like. Accordingly, as is described in greater detail herein, the arcuate body can rotate around the axis of rotation 108 to move the target body 104 from being positioned in the dissenting state (FIG. 4A) to being positioned in the assenting state (FIG. 4B).

The part detection fixture 100 can comprise a guide member 106 for constraining the motion of the workpiece 86 along a part receiving path 120. The guide member 106 can be attached to the vertical member 110 and extend at least a portion of the part receiving path 120. In some embodiments, the part receiving path 120 can extend through a part introduction region 122, which can correspond to the top (maximum z) of the guide member 106, and a part forming region 124, which can correspond the bottom (minimum z) of the guide member 106. In further embodiments, the guide member 106 can be configured to accept the workpiece 86 and locate the workpiece to a desired location. Accordingly, the guide member 106 can be flared such that the part introduction region 122 of the guide member 106 has a greater offset from the part receiving path 120 than the part forming region 124 of the guide member 106. Referring to the coordinate system of FIGS. 4A and 4B, the guide member 106 can be flared such that the part introduction region 122 begins at a minimum x position and gradually increases in x value as the guide member 106 curves in the negative z direction. Moreover, the guide member 106 can transition from being flared to being substantially linear from the part introduction region 122 of the guide member 106 towards the part forming region 124 of the guide member 106.

Referring collectively to FIGS. 1, 2, 5A and 5B, the system 10 can further comprise a part detection fixture 200 for detecting the presence of the workpiece 86 within the second press station 60. Like the part detection fixture 100, the part detection fixture 200 can comprise a guide member 206 for constraining the motion of the workpiece 86 along a part receiving path 120, a vertical member 210 for facilitating movement of a moveable contact member 202 and a mounting member 212 configured for attaching with the second press station 60. Additionally, the part detection fixture can comprise a target body 204 configured for movement in response to movement of the moveable contact member 202, and the moveable contact member 202 can be configured for movement in response to contact with the workpiece 86.

Figure 5B:
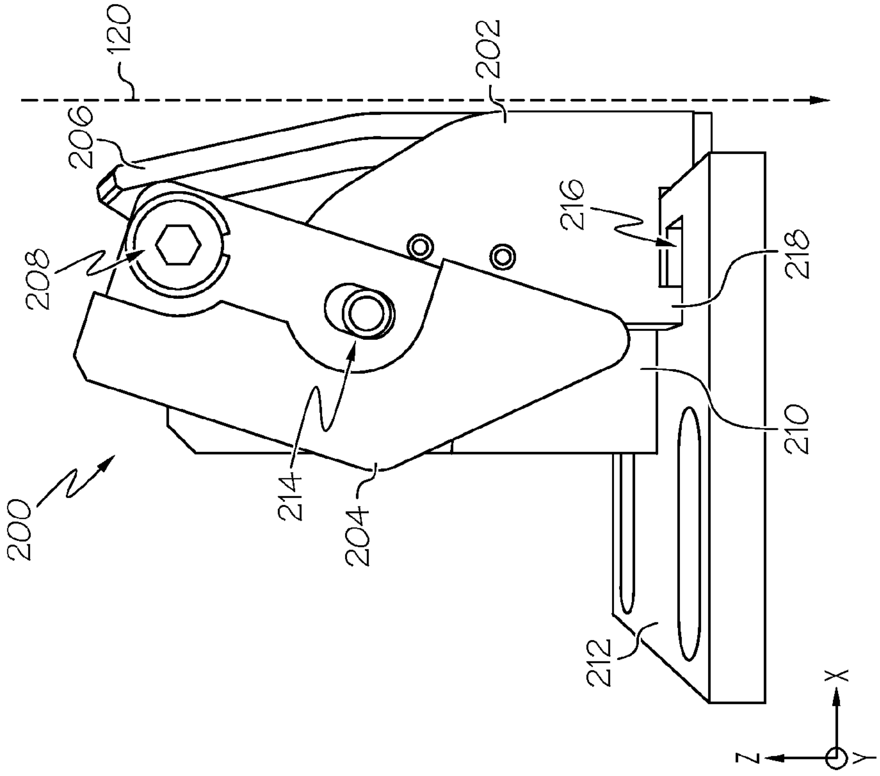
FIGS. 5A and 5B schematically depict a part detection fixture according to one or more embodiments shown and described herein.
Figure 5A:
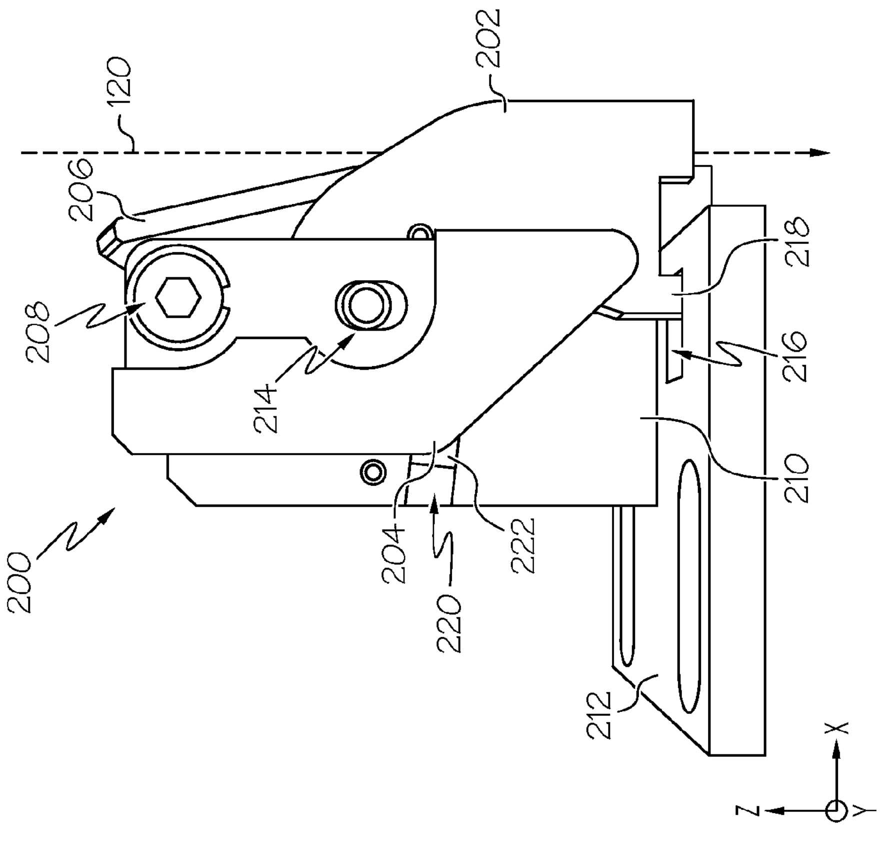

Referring now to FIGS. 5A and 5B, the moveable contact member 202 and the target body 204 can be configured as a moving linkage with each of the moveable contact member 202 and the target body 204 form a link of the linkage. In some embodiments, the moveable contact member 202 can be configured to translate. Specifically, the moveable contact member 202 can be in sliding engagement with the mounting member 212, the vertical member 210, or both. For example, the moveable contact member 202 can comprise a slot engagement member 218 for protruding into the mounting member 212. The mounting member 212 can comprise a slot 216 for accepting and constraining the slot engagement member 218 of the moveable contact member 202. The slot engagement member 218 of the moveable contact member 202 can cooperate with the slot 216 of the mounting member 212 to form the sliding engagement. Alternatively or additionally, the moveable contact member 202 can comprise a slot engagement member 222 for protruding into the vertical member 210. The vertical member 210 can comprise a slot 220 for accepting and constraining the slot engagement member 222 of the moveable contact member 202. The slot engagement member 222 of the moveable contact member 202 can cooperate with the slot 220 of the vertical member 210 to form the sliding engagement.

In some embodiments, the target body 204 can be configured to rotate in response to translation by the moveable contact member 202. Specifically, the target body 204 can be rotatably engaged with the vertical member 210 at an axis of rotation 208. The target body 204 can also form a sliding engagement 214 with the moveable contact member 202. Accordingly, as the moveable contact member 202 moves along the x-direction, the target body 204 can rotate around the axis of rotation 208 and slide via the sliding engagement 214 such that the target body 204 is moved from being positioned in the dissenting state (FIG. 5A) to being positioned in the assenting state (FIG. 5B).

Figure 6B:
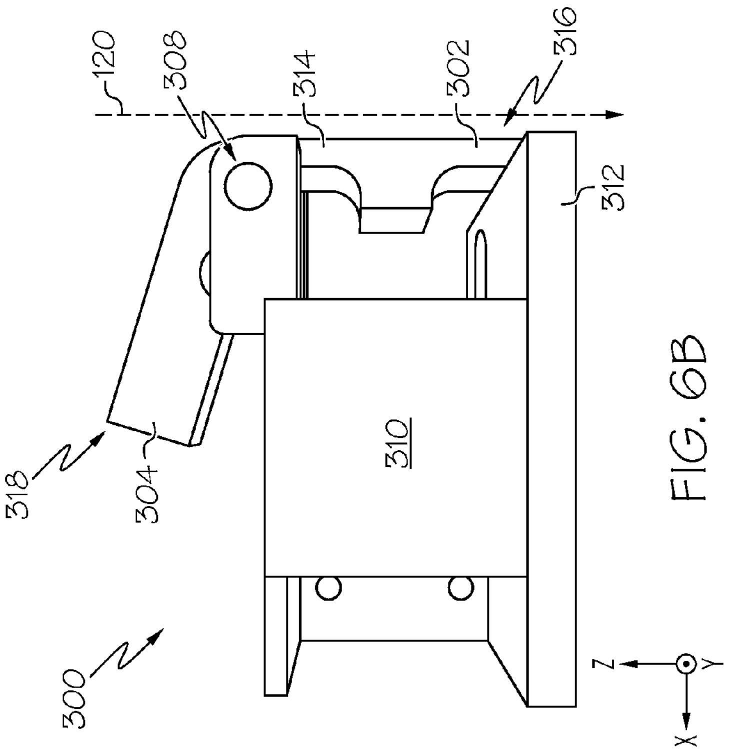
FIGS. 6A and 6B schematically depict a part detection fixture according to one or more embodiments shown and described herein.
Figure 6A:
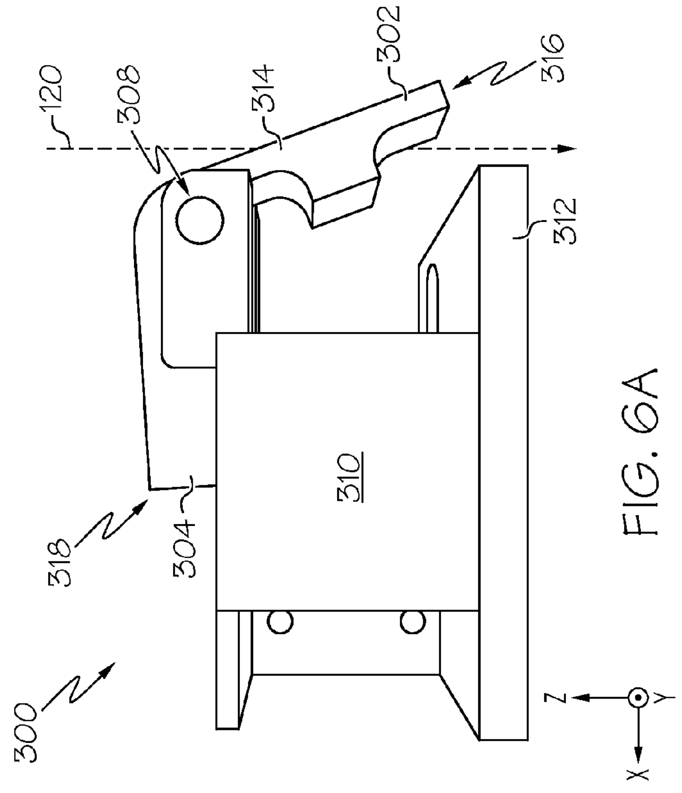

Referring collectively to FIGS. 1, 2, 6A and 6B, the system 10 can further comprise a part detection fixture 300 for detecting the presence of the workpiece 86 within the second press station 60. Like the part detection fixture 100, the part detection fixture 300 can comprise a moveable contact member 302 configured for movement in response to contact with the workpiece 86, a target body 304 configured for movement in response to movement of the moveable contact member 302, a vertical member 310 for facilitating movement of the moveable contact member 102 and a mounting member 312 configured for attaching with the second press station 60. In some embodiments, the moveable contact member 302 can be located at a first end 316 of an arcuate body 314 and the target body 304 can be located at a second end 318 of the arcuate body 314. Accordingly, the target body 304 can be offset vertically (z-direction), horizontally (x-direction or y-direction), or both from the moveable contact member 302. Additionally, the arcuate body 314 can be rotatably engaged with the vertical member 310 at an axis of rotation 308. Accordingly, as is described in greater detail herein, the arcuate body 314 can rotate around the axis of rotation 308 to move the target body 304 from being positioned in the dissenting state (FIG. 6A) to being positioned in the assenting state (FIG. 6B).

Referring again to FIG. 1, embodiments of the system 10 can comprise the press assembly 11. The press assembly 11 can comprise the feed assembly 12 for conveying the workpiece 80, the workpiece 82 and the workpiece 86 along the feed direction 22. It is noted that, while each of the workpiece 80, the workpiece 82 and the workpiece 86 is described as separate objects, any of the processes that are described as being applied to any of the workpiece 80, the workpiece 82 and the workpiece 86 can be applied to each of the workpiece 80, the workpiece 82 and the workpiece 86. For example, the press assembly 11 can be configured as a manufacturing line whereby a plurality of processes is applied to each object according to a predetermined sequence. In some embodiments, the press assembly 11 can comprise the first press station 40 and second press station 60 that are configured to progressively form the workpiece 86. Accordingly, the complimentary die assembly 42 of the first press station 40 can be configured to form the workpiece 80 into the workpiece 82, and the complimentary die assembly 62 of the second press station 60 can be configured to form the workpiece 82 into the workpiece 86.

The system 10 can comprise the actuation system 20 operably coupled to the feed assembly 12, the first press station 40, the second press station 60. Accordingly, the actuation system 20 can be configured to provide the motive force to the feed assembly 12 for the conveyance of the workpiece 86. The actuation system 20 can further be configured to provide the motive force for opening and closing the ram member 44 and the bolster member 48 of the first press station 40. Additionally, the actuation system 20 can be configured to provide the motive force for opening and closing the ram member 64 and the bolster member 68 of the second press station 60.

The system 10 can comprise the control system 30 having one or more processors 32 communicatively coupled to the actuation system 20. Accordingly, the one or more processors 32 of the control system 30 can execute manufacturing functions to cause the actuation system 20 to operate automatically and thus, the press assembly 11 to operate automatically. For example, the manufacturing functions can include movement of the feed assembly, the first press station 40, the second press station 60, or combinations thereof.

The system 10 can comprise the vision system 90, wherein the vision system 90 is communicatively coupled to the one or more processors 32 of the control system 30. As is noted above, the vision system 90 can comprise integral processors for performing image processing functions. Accordingly, the vision system 90, the one or more processors 32 of the control system 30, or combinations thereof can perform image processing functions. Moreover, the one or more processors 32 of the control system 30 can facilitate the exchange of inputs and outputs from between the manufacturing functions and the image processing functions. As a result, the image processing functions can be integrated with the manufacturing functions.

Referring collectively to FIGS. 1, 2, 4A, 5A, and 6A, the system 10 can comprise the part detection fixture 100, the part detection fixture 200, the part detection fixture 300, or a combination thereof. In some embodiments, the part detection fixture 100 can be located within the field of view 92 of the vision system 90. The part detection fixture 100 can be attached to the second press station 60. Specifically, the part detection fixture 100 can be attached to the bolster member 68 such that, when the target body 104 is in the dissenting state (FIG. 4A), the moveable contact member 102 obstructs the part receiving path 120. Alternatively or additionally, the part detection fixture 200 can be located within the field of view 92 of the vision system 90 and can be attached to the second press station 60. Specifically, the part detection fixture 200 can be attached to the bolster member 68 such that, when the target body 204 is in the dissenting state (FIG. 5A), the moveable contact member 202 obstructs the part receiving path 120. Alternatively or additionally, the part detection fixture 300 can be located within the field of view 92 of the vision system 90 and can be attached to the second press station 60. For example, the part detection fixture 300 can be attached to the bolster member 68 such that, when the target body 304 is in the dissenting state (FIG. 6A), the moveable contact member 302 obstructs the part receiving path 120.

Referring collectively to FIGS. 1, 2, 3A, 4A and 4B, the second press station 60 can be caused to automatically open by the actuation system 20 and the control system 30. Accordingly, the ram die 74 and the ram member 64 can have a relatively large offset from the bolster die 72 and the bolster member 68. The relatively large offset can be large enough to receive the workpiece 86 via the feed assembly 12. In some embodiments, feed assembly can be configured to urge the workpiece 86 along the part receiving path 120.

Figure 4A:
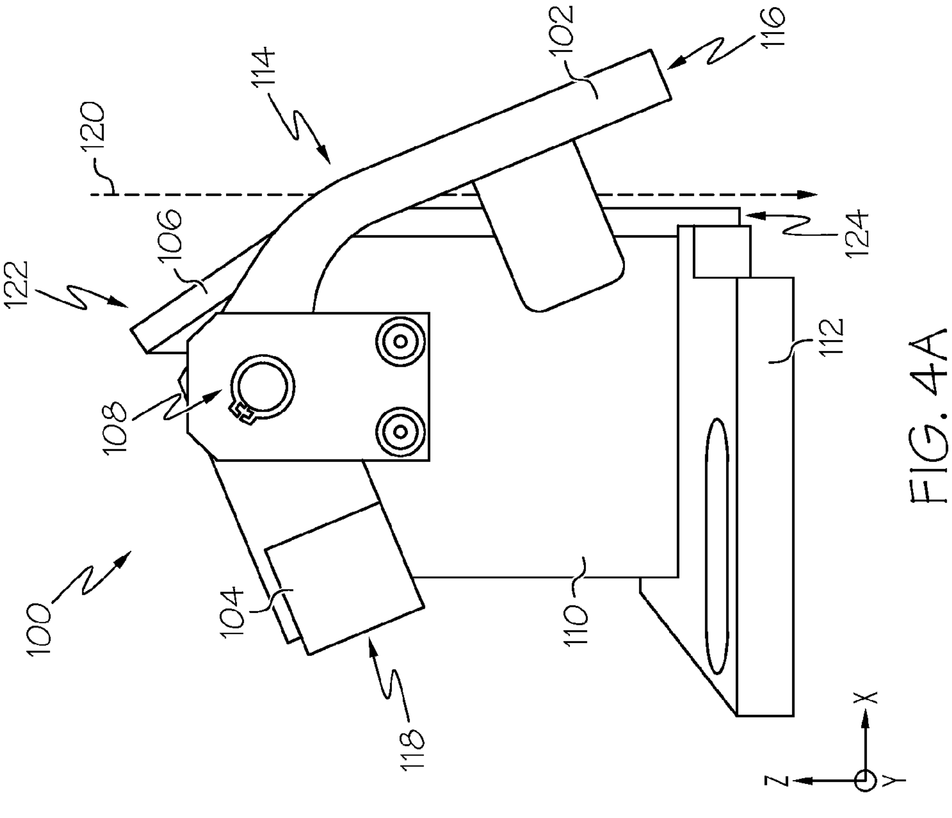

When the complimentary die assembly 62 is clear of the workpiece 86, the part detection fixture 100 can be configured to be in the dissenting state (FIG. 4A). Specifically, the target body 104 can be positioned in the dissenting state. Additionally, the moveable contact member 102 can obstruct the part receiving path 120, such that the moveable contact member 102 is operable to make contact with the workpiece 86 as the workpiece 86 travels along the part receiving path 120. In some embodiments, the manufacturing functions can be configured to urge the workpiece 86 along the part receiving path 120 only when the part detection fixture 100 indicates that the complimentary die assembly 62 is clear of the workpiece 86.

Figure 7:
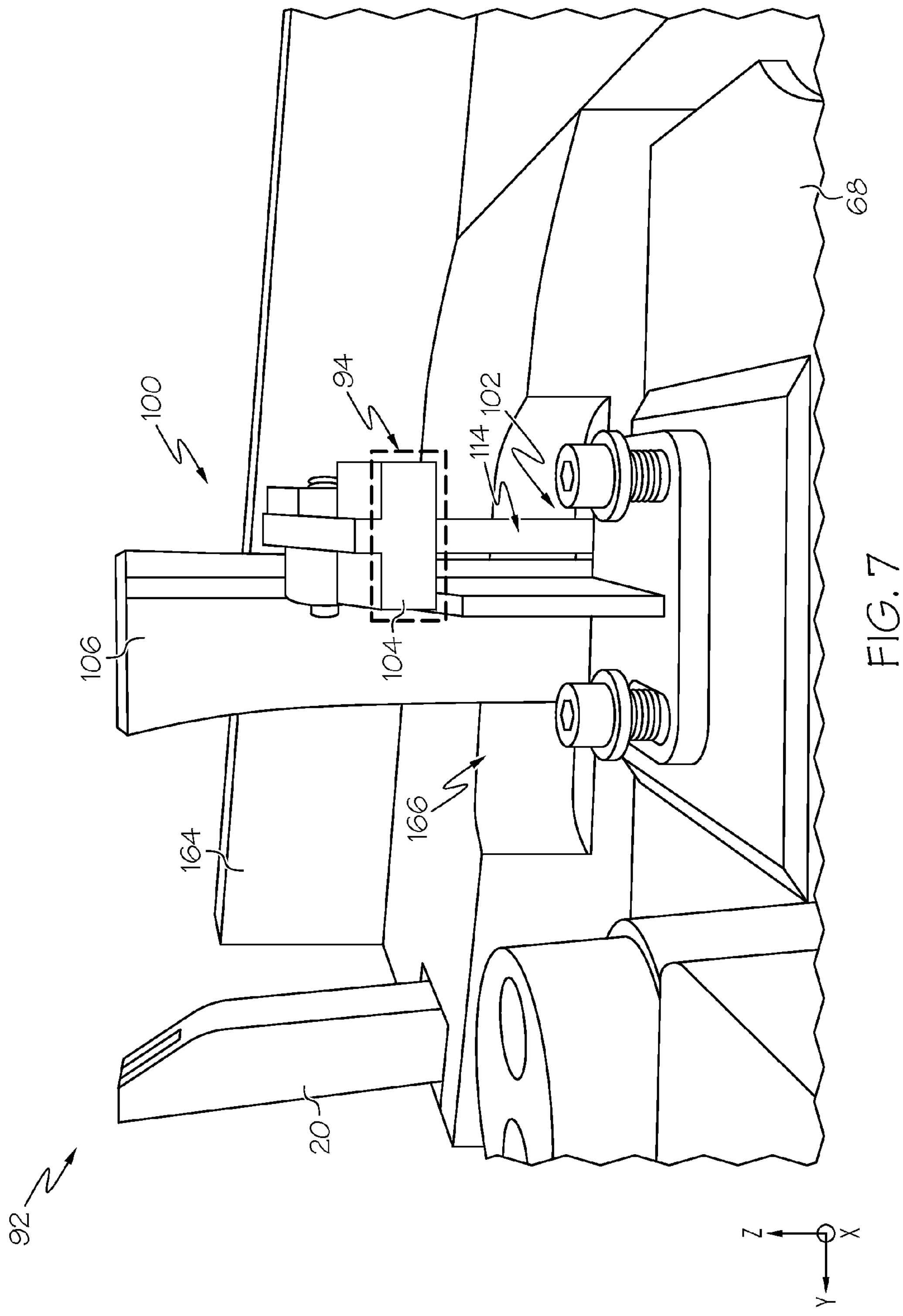
FIG. 7 schematically depicts image data of a field of view of a vision system according to one or more embodiments shown and described herein.

Referring collectively to FIGS. 1 and 7, the vision system can detect image data of the target body 104 of the part detection fixture 100. The image processing functions can automatically analyze the image data to determine the state of the target body 104 of the part detection fixture 100. In some embodiments, the image processing functions can compare the image data with a detection region 94. The detection region 94 can be associated with a predetermined state, e.g., the assenting state or the dissenting state. In embodiments, where the detection region is associated with the assenting state, the image processing functions can determine that the target body 104 is in the dissenting state when a predetermined dissenting quantity of the target body 104 is outside of the detection region 94. It is noted that, while the detection region 94 is depicted in FIG. 7 as being associated with the assenting state, the image processing functions described herein can utilize additional detection regions or alternative detection regions to determine that the target body 104 of the part detection fixture 100 is in the dissenting state. It is furthermore noted that the image processing functions can utilize alternative analyses to determine the state of the target body 104 of the part detection fixture 100 such as, but not limited to, edge detection, corner detection, blob detection, or any other image processing function suitable for detecting the position of the target body 104 relative to the field of view 92 of the vision system 90.

Referring collectively to FIGS. 1, 4A and 4B, upon determining that the complimentary die assembly 62 is open and that the target body 104 of the part detection fixture 100 is in the dissenting state, the manufacturing functions can automatically cause the workpiece 86 to be urged along the part receiving path 120 by the feed assembly 12. Accordingly, the introduction of the workpiece 86 into the cleared and open complimentary die assembly 62 can cause the target body 104 of the part detection fixture 100 to transition from the dissenting state (FIG. 4A) to the assenting state (FIG. 4B). Specifically, as the workpiece 86 is urged along the part receiving path 120, the workpiece 86 can be constrained by the guide member 106. Additionally, the workpiece 86 can contact the moveable contact member 102 of the part detection fixture 100. The contact between the workpiece 86 and the moveable contact member 102 can cause the moveable contact member 102 to move such that the moveable contact member 102 no longer obstructs the part receiving path 120. The motion of the moveable contact member 102 out of the part receiving path 120 can cause the target body 104 of the part detection fixture 100 to transition to the assenting state (FIG. 4B). Thus, the target body 104 of the part detection fixture 100 can be placed or maintained in the assenting state (FIG. 4B) coincident with contact between the moveable contact member 102 of the part detection fixture 100 and the workpiece 86. Moreover, because of the offset between the moveable contact member 102 and the target body 104 of the part detection fixture 100, the contact between the moveable contact member 102 of the part detection fixture 100 and the workpiece 86 can be obscured from the vision system 90, while the target body 104 is detected by the vision system 90. For example, the moveable contact member 102 of the part detection fixture 100 can be outside of the field of view 92 of the vision system 90 and the target body 104 of the part detection fixture 100 can be within the field of view 92 of the vision system 90, while the target body 104 of the part detection fixture 100 is located in the assenting state (FIG. 4B).

Referring collectively to FIGS. 1, 4B and 7, the vision system 90 can detect image data of the target body 104 of the part detection fixture 100, while the target body 104 is in the assenting state (FIG. 4B). The image processing functions can automatically analyze the image data to determine whether the target body 104 is in the assenting state (FIG. 4B). In some embodiments, the image processing functions can compare the image data with a detection region 94 that is associated with the assenting state. Accordingly, the image processing functions can determine that the target body 104 is in the dissenting state when a predetermined assenting quantity of the target body 104 is inside the detection region 94. It is noted that, while the detection region 94 is depicted in FIG. 7 as being associated with the assenting state, the image processing functions described herein can utilize additional detection regions or alternative detection regions to determine that the target body 104 of the part detection fixture 100 is in the assenting state. It is furthermore noted that the image processing functions can utilize alternative analyses to determine the state of the target body 104 of the part detection fixture 100 such as, but not limited to, edge detection, corner detection, blob detection, or any other image processing function suitable for detecting the position of the target body 104 relative to the field of view 92 of the vision system 90.

Upon determining that the complimentary die assembly 62 is open and that the target body 104 of the part detection fixture 100 is in the assenting state, the manufacturing functions can automatically cause actuation of the second press station 60. Specifically, when the image data of the target body 104 is indicative of the assenting state, the complimentary die assembly 62 can be urged closed to form the workpiece 86. Accordingly, the ram die 74 and the ram member 64 can have a relatively small offset from the bolster die 72 and the bolster member 68. The relatively small offset can be small enough to impart the desired shape to the workpiece 86 with the complimentary die assembly 62. After the second press station 60 has completed the forming process, the manufacturing functions can automatically open the complimentary die assembly 62 and remove the workpiece 86 from the second press station 60. For example, the feed assembly 12 can remove the workpiece 86 and convey the workpiece along the feed direction 22 for further processing or for delivery. Next, the workpiece 82 can be formed in the second press station 60 as is described above with respect to the workpiece 86. Moreover, the manufacturing functions and the image processing functions can be automated and repeated periodically, as is described above with respect to the workpiece 86, to form a relatively large volume of parts.

As is noted above, the system 10 can comprise one or more of the part detection fixtures 100, 200, 300 located within the field of view 92 of the vision system 90. For the sake of clarity, and not by way of limitation, a description of the system 10 is provided above with respect to the part detection fixture 100 alone. However, it is noted that the system 10 can utilize the part detection fixture 100, the part detection fixture 200, and the part detection fixture 300 alone or in combination in a manner analogous to the description of the system 10 provided above without departing from the scope of the present disclosure.

It should now be understood, the embodiments described herein can include systems and methods for controlling a manufacturing process making use of a vision system. For example, the vision system can be configured to capture image data indicative of the position of target bodies of part detection fixtures. The target bodies and the part detection fixtures can be shaped in various ways. Accordingly, the target bodies can be offset from the detected workpiece in a manner that is amenable to the field of view of the vision system, even when the detected workpiece is obscured from or outside of the field of view of the vision system.

Furthermore, it is noted that directional references such as, for example, feed direction, press direction, part receiving path, X-axis, X-direction, Y-axis, Y-direction, Z-axis, Z-direction or the like have been provided for clarity and without limitation. Specifically, it is noted such directional references are made with respect to the coordinate system depicted in FIGS. 1-7. Thus, the directions may be reversed or oriented in any direction by making corresponding changes to the provided coordinate system with respect to the structure to extend the examples described herein.

It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling a manufacturing process, the method comprising:

progressively moving a workpiece to each of a plurality of press stations;

obstructing a part receiving path of a first press station with a part detection fixture, wherein the part detection fixture is attached to the first press station and comprises a moveable contact member and a target body that moves in response to motion of the moveable contact member, and wherein the moveable contact member of the part detection fixture obstructs the part receiving path such that the target body of the part detection fixture is positioned in a dissenting state;

receiving the workpiece along the part receiving path of the first press station;

contacting the moveable contact member of the part detection fixture with the workpiece, wherein the target body of the part detection fixture is positioned in an assenting state coincident with contact between the moveable contact member of the part detection fixture and the workpiece;

detecting image data of the target body of the part detection fixture in at least two dimensions with a vision system, while the target body of the part detection fixture is positioned in the assenting state, whereby the image data of the target body is indicative of the assenting state; and actuating the first press station when the image data of the target body is indicative of the assenting state.

2. The method of claim 1, further comprising: comparing image data of the target body of the part detection fixture with a detection region, wherein the image data of the target body is indicative of the assenting state when a predetermined assenting quantity of the target body is inside the detection region.

3. The method of claim 1, further comprising:

obscuring contact between the moveable contact member of the part detection fixture and the workpiece from the vision system.

4. The method of claim 1, further comprising:

constraining the workpiece with a guide member, wherein the part detection fixture comprises the guide member, and wherein the guide member extends along at least a portion of the part receiving path.

5. The method of claim 1, further comprising:

illuminating a field of view of the vision system with an infrared light source.

6. The method of claim 1, wherein the part detection fixture comprises an arcuate member having a first end and a second end, and wherein the moveable contact member is located at the first end of the arcuate member and the target body is located at the second end of the arcuate member.

7. The method of claim 1, wherein the first press station forms a portion of a transfer press.

8. The method of claim 1, further comprising:

rotating the moveable contact member of the part detection fixture with the workpiece.

9. The method of claim 1, further comprising:

translating the moveable contact member of the part detection fixture with the workpiece.

10. A method for controlling a manufacturing process, the method comprising:

progressively moving a workpiece to each of a plurality of press stations;

obstructing a part receiving path of a first press station with a part detection fixture, wherein the part detection fixture is attached to the first press station and comprises a moveable contact member and a target body that moves in response to motion of the moveable contact member, and wherein the moveable contact member of the part detection fixture obstructs the part receiving path such that the target body of the part detection fixture is positioned in a dissenting state;

detecting image data of the target body of the part detection fixture in at least two dimensions with a vision system, while the target body of the part detection fixture is positioned in the dissenting state, whereby the image data of the target body is indicative of the dissenting state; and receiving the workpiece along the part receiving path of the first press station when the image data of the target body is indicative of the dissenting state.

11. The method of claim 10, further comprising:

contacting the moveable contact member of the part detection fixture with the workpiece; and moving the moveable contact member and the target body of the part detection fixture with contact between the moveable contact member of the part detection fixture and the workpiece.

12. The method of claim 11, further comprising:

obscuring the contact between the moveable contact member of the part detection fixture and the workpiece from the vision system.

13. The method of claim 11, wherein the moveable contact member is rotated by the contact between the moveable contact member of the part detection fixture and the workpiece.

14. The method of claim 11, wherein the moveable contact member is translated by the contact between the moveable contact member of the part detection fixture and the workpiece.

15. The method of claim 10, further comprising:

constraining the workpiece with a guide member, wherein the part detection fixture comprises the guide member, and wherein the guide member extends along at least a portion of the part receiving path.

16. The method of claim 10, further comprising:

illuminating a field of view of the vision system with an infrared light source.

17. The method of claim 10, wherein the first press station forms a portion of a transfer press.

18. A system for controlling a manufacturing process, the system comprising:

a plurality of press stations, wherein a workpiece is progressively moved to each of the plurality of press stations;

a first press station comprising a ram member and a bolster member, wherein the ram member is operable to move relative to the bolster member;

a complimentary die assembly comprising a ram die attached to the ram member and a bolster die attached to the bolster member;

a feed assembly operable to move the workpiece with respect to the first press station;

an actuation system operably coupled to the feed assembly and the first press station;

a part detection fixture attached to the bolster member of the first press station, the part detection fixture comprising a moveable contact member and a target body that moves in response to motion of the moveable contact member, and wherein the moveable contact member of the part detection fixture obstructs a part receiving path of the first press station;

a vision system with the capability to detect image data in at least two dimensions, having a field of view, wherein the target body of the part detection fixture is located within the field of view of the vision system; and a control system communicatively coupled to the actuation system and the vision system, wherein the control system executes functions to automatically:

open the first press station wherein the ram die and the bolster die are separated by a relatively large offset;

receive image data of the target body of the part detection fixture from the vision system;

urge the workpiece along the part receiving path of the first press station, after the image data of the target body is indicative of the target body of the part detection fixture located in a dissenting state, wherein the workpiece contacts the moveable contact member of the of the part detection fixture, while being urged along the part receiving path of the first press station, and wherein contact between the moveable contact member of the part detection fixture and the workpiece causes the target body of the part detection fixture to move to an assenting state; and close the first press station wherein the ram die and the bolster die are separated by a relatively small offset, when the image data of the target body is indicative of the target body of the part detection fixture located in the assenting state.

19. The system of claim 18, wherein the part detection fixture comprises a guide member that constrains motion of the workpiece along the part receiving path of the first press station, and wherein the guide member extends along at least a portion of the part receiving path.

20. The system of claim 18, wherein the contact between the moveable contact member of the part detection fixture and the workpiece is obscured from the vision system.

* * * * *